United States Patent [19]

Terry

[11] Patent Number: 5,524,506
[45] Date of Patent: Jun. 11, 1996

[54] HANDLEBAR FOR A BICYCLE

[76] Inventor: Georgena Terry, 1891 Dublin Rd., Penfield, N.Y. 14526

[21] Appl. No.: 312,887

[22] Filed: Sep. 27, 1994

[51] Int. Cl.$^6$ ............................................. B62K 21/12
[52] U.S. Cl. ................................. 74/551.9; 74/551.1
[58] Field of Search .............................. 74/551.1, 489, 74/502.2, 551.9

[56] References Cited

U.S. PATENT DOCUMENTS 5,083,476  1/1992  Borromeo ........................... 74/551.1
5,257,683  11/1993  Romano ............................... 74/489

*Primary Examiner*—Rodney H. Bonck
*Assistant Examiner*—Chong H. Kim
*Attorney, Agent, or Firm*—Howard J. Greenwald

[57] ABSTRACT

A substantially integral handlebar for bicycles, comprising a generally straight central part and two lateral handles at opposite ends of the central part which extend generally downwardly. Each of such handles contains an intermediate section with a reduced width of from about 0.7 to about 1.4 centimeters.

7 Claims, 3 Drawing Sheets

U.S. Patent  Jun. 11, 1996  Sheet 1 of 3  5,524,506
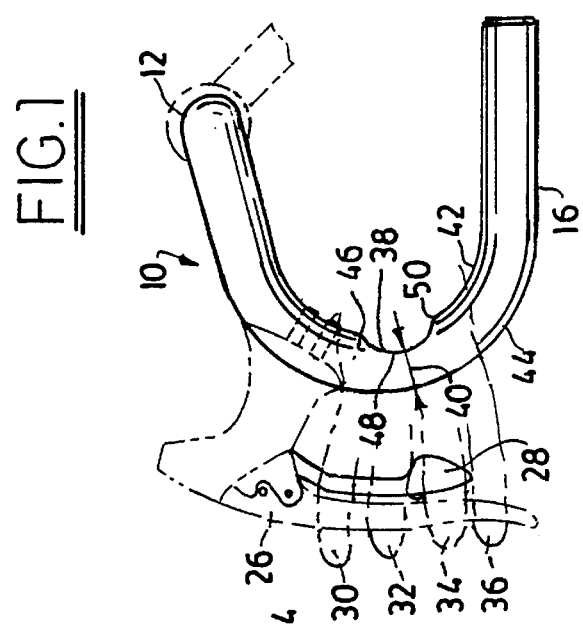
FIG.1
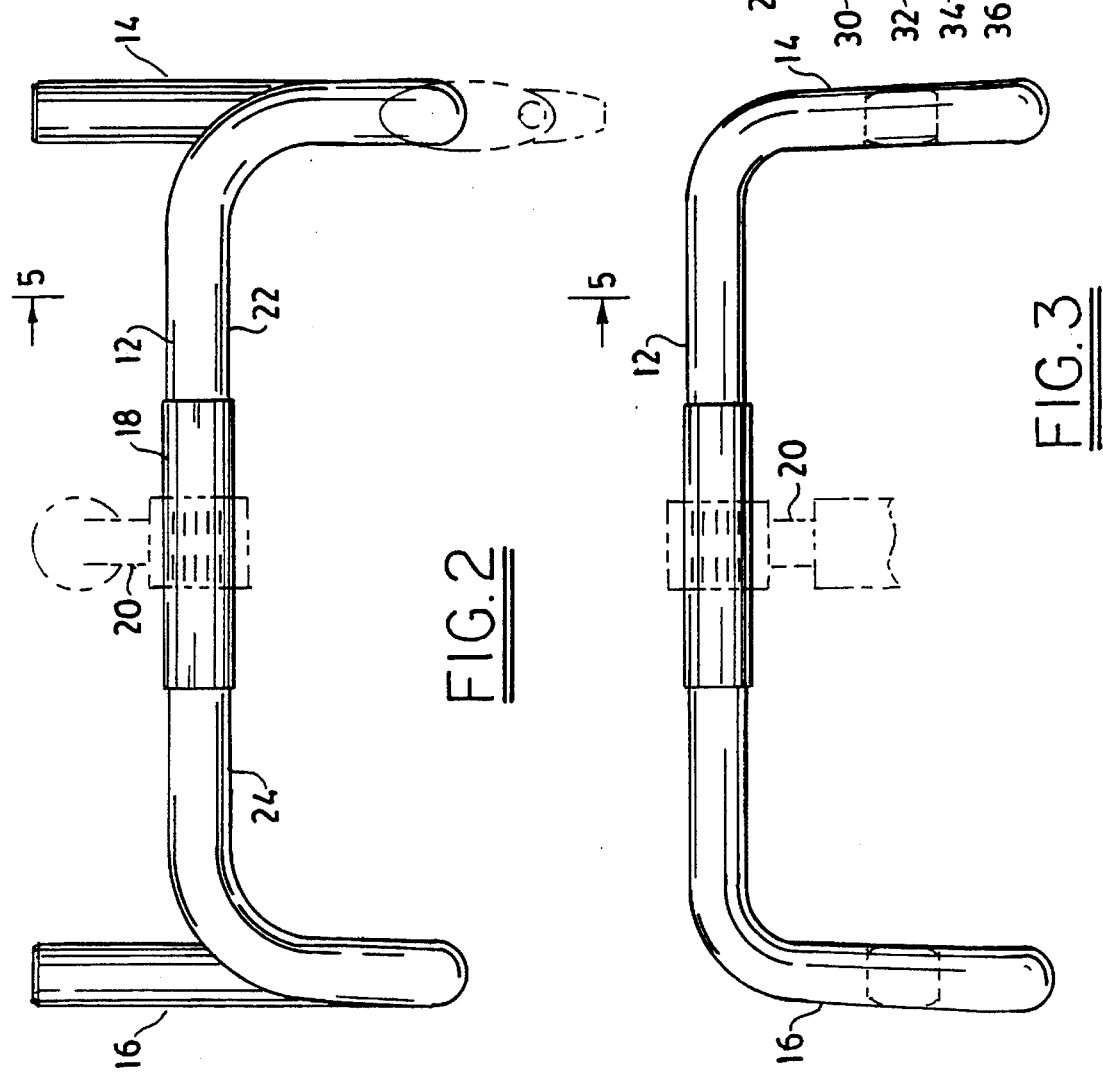
FIG.2
FIG.3

HANDLEBAR FOR A BICYCLE

FIELD OF THE INVENTION

A handlebar for a bicycle which has two reduced diameter sections on the interior curvatures of the drop sections of the handlebar.

BACKGROUND OF THE INVENTION

As is disclosed in U.S. Pat. No. 4,462,267 of Shimano, which was issued in 1984, handlebars for bicycles are generally made from a metallic pipe and integrally comprise a bar body and gripping portions carrying braking control levers or the like through bracket members; the bracket members are generally separated from the gripping portions of the handlebar and are fixed thereto by the use of bands.

In 1989, in U.S. Pat. No. 4,829,847 of Modolo, ergonomic problems with conventional bicycle handlebars were discussed. At column 1 of this patent, Modolo disclosed that "The grip of a handlebar . . . is generally in the form of a tube having a single radius bend. The palm of the hand must thus adhere to the bend; it will therefore lie on the two ends leaving an empty space in the central part. This causes a thickening of the skin at the extremities of the palm, as well as skin irritations and in general increased effort and a contraction of the hand and wrist muscles. This state of tension jeopardizes driving safety and requires in general an increased effort on the part of the rider . . . "

The Modolo handlebar has met with a fair amount of commercial success, but it was not entirely satisfactory. Thus, as was noted in the 1992 patent of Borremeo, " . . . a selectively variable radius of curvature has already been proposed by several parties in the art, particularly for the central portion of the handle on which the palm of the cyclists hand is intended to rest. These solutions, and particularly that of making the central portion of the handle straight or almost straight, cannot be considered completely satisfactory from the anatomical and ergonomic points of view."

The solution provided by the Borremeo patent was to provide a handlebar with lateral handles containing alternating concave and convex sections.

Although the handlebar of the Borremeo patent arguably provides more comfort for those riders who frequently race bicycles in the common "racing tuck" position in which the riders chin is near the handlebar, it does not do anything for the vast majority of riders who use bicycles for primarily recreational purposes and ride in a substantially more upright position. These latter riders most commonly grasp the bicycle handlebar in the rearward facing concave portions of the handlebar while simultaneously resting their fingers on the brake levers attached to said concave portions.

In many of the more modern bicycle designs, the shift levers are mounted underneath the brake levers. Although this design allows the bicycle rider to shift and/or brake without moving his hands, there is a price to pay: the brake levers must be mounted further away from the concave sections of the handlebar in order to allow the shift levers to be disposed between the brake levers and such concave sections.

Many riders, especially those with relatively small hands and fingers, find it difficult to safely grasp the brake levers on such modern brake/shift lever designs. Even in those older models which do not dispose the shift levers underneath the brake levers, it is still difficult for many riders to comfortably and readily grasp the brake levers.

There is a certain minimum size required for effective brake levers, which size is dictated in part by the size of the mechanism required for the braking action and the minimum throw required for effective braking without having the brake lever hit the handlebar. Furthermore, because most braking mechanisms are a substantially standard size, it is desirable to provide a handlebar which accommodates such conventional braking devices.

One could, presumably, change the size of the handlebar to decrease the distance between it and the brake levers. However, a handlebar with too small a diameter would not possess the required tensile strength, would not be compatible with the standard brake lever fittings, and would not be comfortable. It seems that, for every problem solved by the modification of a standard handlebar assembly, at least one other problem is created.

It is an object of this invention to provide a handlebar assembly for a bicycle which allows riders with relatively small hands to comfortably and safely grasp the brake levers mounted on the handlebar, which is compatible with standard brake lever and shift assemblies, and which is at least as comfortable in substantially every respect as standard handlebar assemblies.

SUMMARY OF THE INVENTION

In accordance with this invention, there is provided a handlebar assembly comprised of a substantially straight central part and two lateral handles at opposite ends of the central part. Each of the lateral handles has an interior curved portion with a reduced diameter substantially concave section of particular dimensions and location.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is a side view of one preferred handlebar assembly of the invention connected to a shift lever and a brake lever;

FIG. 2 is a top view of the assembly of FIG. 1;

FIG. 3 is a front view of the assembly of FIG. 1;

DESCRIPTION OF THE PREFERRED EMBODIMENTS

Figure 4:
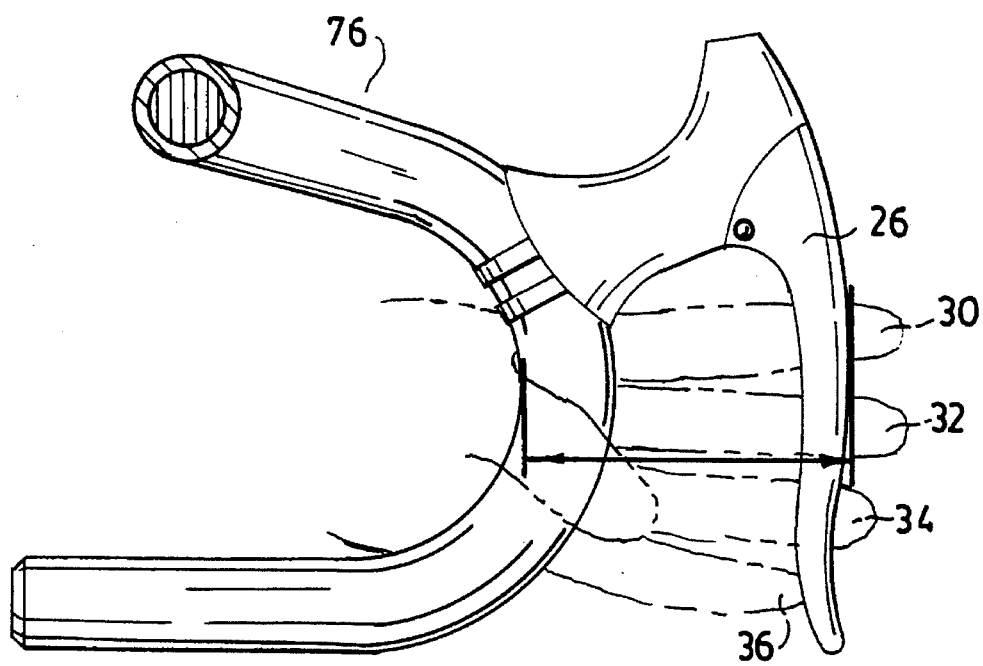
FIG. 4 is a side view of a prior art handlebar assembly.

Conventional bicycle handlebars generally have a substantially straight central part adapted to be connected to the steering column of a bicycle and two lateral handles at opposite ends of said central part. See, for example, the handlebars disclosed in U.S. Pat. Nos. 4,503,729, 4,829,847, 4,903,542, 4,083,476, 5,131,289, and the like. The disclosure of each of these United States patents is hereby incorporated by reference into this specification.

DESCRIPTION OF THE PREFERRED EMBODIMENTS

FIG. 1 is a side view of one preferred handlebar 10 which is comprised of a substantially straight central portion 12 and two lateral handles 14 and 16 at opposite ends of central part 12 (see FIGS. 1, 2, 3, and 5).

The handlebar 10 preferably consists or is comprised of one or more high-strength materials. Thus, e.g., the handlebar 10 may consist essentially of aluminum, aluminum alloy, steel carbon fiber, titanium, and the like. In one preferred embodiment, handlebar 10 consists essentially of one or more alloys of aluminum. Thus, referring to pages 23–47 to 23–48 of Robert H. Perry et al.'s "Chemical Engineers' Handbook," Fifth Edition (McGraw-Hill Book Company, New York, 1973), one may use aluminum alloy 6063 (which is comprised of at least 95 weight percent of aluminum and less than 1 percent each of silicon and magnesium), alloy 7075 (which is comprised of at least 90 weight percent of aluminum and less than 6 percent each of zinc, copper, magnesium, and chromium), and the like.

Referring to FIGS. 2 and 3, and in the preferred embodiment illustrated therein, it will be seen that handlebar 10 is comprised of a strengthened region 18 to which the handlebar stem 20 of the bicycle (not shown) may be attached. In general, strengthened region 18 has stronger than the adjacent portions 22 and 24 of substantially straight portion 12. As is known to those skilled in the art, one means of making portions 22 and 24 stronger is by using more material in such portions. Alternatively, or additionally, one may use material with superior strength properties. Thus, in one embodiment, strengthened portion 18 is made from a different aluminum alloy than is adjacent portions 22 and 24.

Referring again to FIGS. 1, 2, 3, and 5, it will be seen that handlebar 10 is preferably a substantially integral structure which, preferably, is comprised of an extended tubular member shaped to form sections 12, 14, and 16.

It is preferred that the tubular member define an interior cavity which, along at least about 90 percent of its length, has a substantially circular cross-sectional shape. However, the interior of the tubular member may have other cross-sectional shapes such as, e.g., a hexagonal shape, an octagonal shape, etc. However, in one preferred embodiment, it is preferred that the interior of the tubular member be substantially symmetrical, that is, it has a shape such that a line can be drawn through it to define two identically shaped and sized halves.

Referring again to FIG. 1, and in the preferred embodiment illustrated therein, it will be seen that a brake lever assembly is attached to each of lateral handles 14 and 16. In this embodiment, disposed beneath brake assembly 26, is shift lever 28.

As is known to those skilled in the art, in many of the more expensive bicycles, a shift lever assembly is mounted directly onto the brake lever assembly which, in turn, is mounted onto the handlebar. See, e.g., U.S. Pat. No. 5,009,629, the entire disclosure of which is hereby incorporated by reference into this specification.

Referring again to FIG. 1, a rider's fingers 30, 32, 34, and 36 are illustrated grasping brake lever 26; for the sake of simplicity, the rider's thumb, palm, and other body parts have been omitted from this Figure. However, as will be apparent to those skilled in the art, the fleshy part of the rider's hand between his thumb and forefinger must curve around indented section 38 so that the thumb (not shown) may also wrap around handlebar 10. Because the thumb is connected to the rest of the rider's hand, the closer the thumb is to the brake lever 26, the more readily the rider can grasp brake lever 26 with his fingers.

Referring again to FIG. 1, and to section 38 of handle 16, it will be seen that the distance 40 between the interior surface 42 of handle 16 and the exterior surface 44 of handle 16 decreases from point to midpoint 48 of section, and thereafter increases from midpoint 48 to point 50 of section 38. The distance between interior surface 42 and exterior surface 44 at midpoint 48 will be at least about 1.0 centimeter less than the distance between surfaces 42 and 44 at either of endpoints 46 and 50; preferably it is from about 1.0 to about 1.5 centimeters.

The distance between interior surface 42 and exterior surface 44 at either point 46 and 50 may be the same or different, but such distance will generally range from about 2.2 to about 2.4 centimeters. The distance between interior surface 42 and exterior surface 44 at midpoint 48 will generally range from about 0.7 to about 1.4 centimeters.

Figure 5:
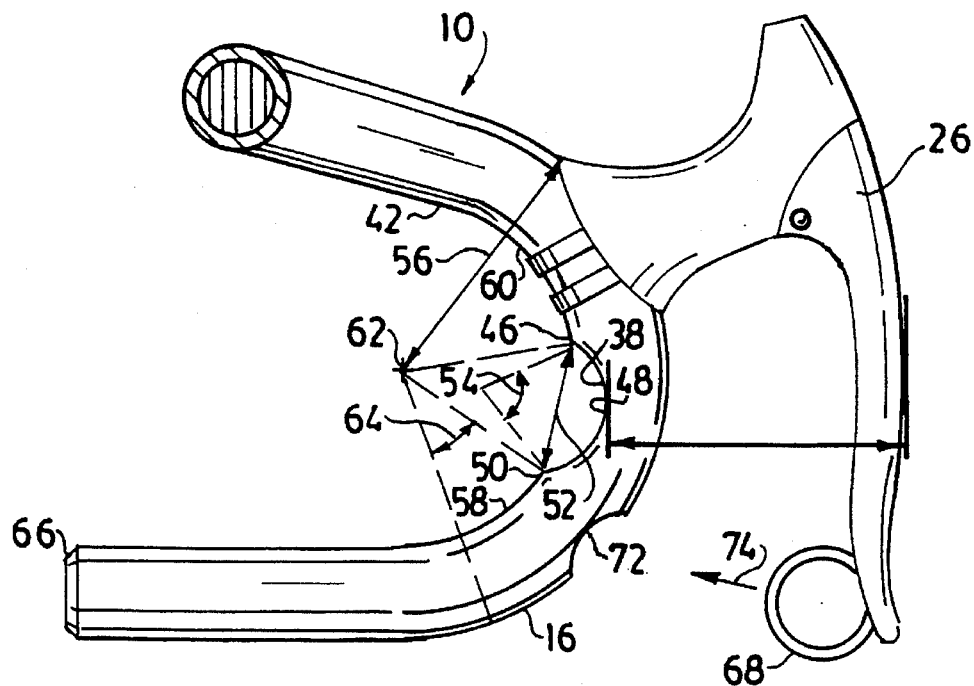
FIG. 5 is a side view of another preferred assembly of this invention.

Referring to FIG. 5, the linear distance 52 between points 46 and 50 will generally be at least about 2.5 centimeters and may range from about 2.5 to about 7.0 centimeters. In one preferred embodiment, such distance 52 is from about 3.0 to about 4.5 centimeters.

In the preferred embodiment illustrated in FIGS. 1, 2, 3, and 5, section 38 has a substantially continuous arcuate shape and, preferably, has a radius of curvature of from about 1 to about 3.0 centimeters and, more preferably, from about 1.2 to about 2.2 centimeters.

Referring to FIG. 5, it will be seen that, in the preferred embodiment illustrated therein, arc 38 extends between points 46 and 50 through an angle which, preferably, is from about 60 to about 120 degrees. It also will be seen that exterior surface 44 is defined by a continuous arcuate section with a radius of curvature 56 which is from about 5.5 to about 8.5 centimeters. The radius of curvature defining outer surface 44 divided by the radius of curvature defining arc 38 generally is at least about 2.0.

Referring again to FIG. 5, it will be seen that inner surface 42 has two discontinuous surfaces 58 and 60 with radii of curvature which, in this embodiment, are substantially identical and share the same center point 62 as does the radius of curvature 56. The discontinuous surface 58 travels through an angle 64 of from about 30 to about 45 degrees.

It will be apparent to those skilled in the art that other configurations may be used for inner surface 42 and outer surface 44. However, in each of the preferred embodiments, the intermediate indented surface 38 is preferably disposed between the end 66 of handle 16 and the top surface (not shown) of substantially straight section 12.

In one embodiment, not shown, a first groove (not shown) and a second groove (not shown) is provided within a portion of each of the inner surfaces 42 of handles 14 and 16 to accommodate cable (not shown) extending from each of brake levers 26 to brake arches (not shown). Alternatively, or additionally, one may also provide an additional two grooves (one for each handle 14 and 16) within a portion of such inner surfaces 42 of each of handles 14 and 16 extending from each of shift levers 28 to a derailleur mechanism.

In one embodiment, illustrated in FIG. 5, a finger ring 68 is attached to the interior surface 70 of brake lever 26 and is adapted to be received within recess 72 when brake lever is moved in the direction of arrow 74.

FIG. 4 illustrates a prior art handlebar assembly 76 and the difficulty a user has in continuously, comfortably, and safely extending fingers 30, 32, 34, and 36 around brake lever 26.

Figure 6:
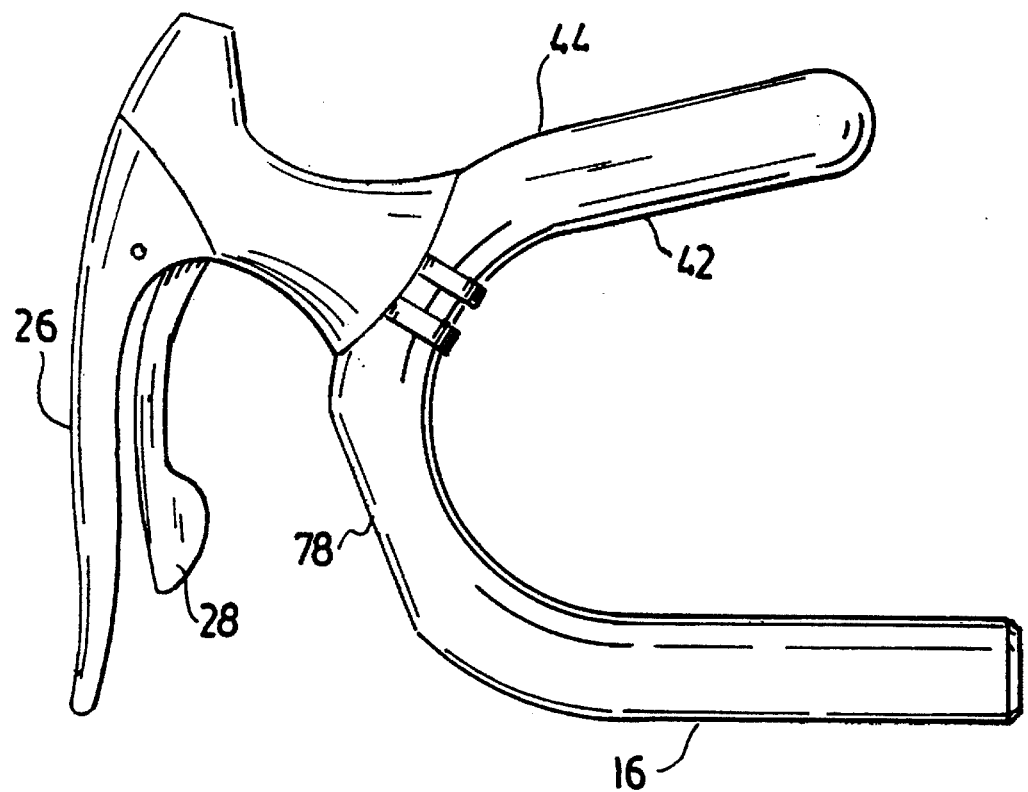
FIG. 6 is a side view of yet another preferred assembly of this invention.

FIG. 6 illustrates another embodiment of this invention in which indented portion 38 is present on the exterior surface 44 of handle 16 rather than on its interior surface 42.

I claim:

1. A substantially integral handlebar for bicycles, comprising a generally straight central part adapted to be connected to the steering column of a bicycle and a first lateral handle and a second lateral handle at opposite ends of said central part of said handlebar which extend generally downwardly, wherein:

(a) said handlebar is comprised of a proximal end, an distal end, and a cavity extending at least about ninety percent of the distance between said proximal end and said distal end;

(b) each of said first lateral handle and said second lateral handle is comprised of an end, an outer surface extending from said end to said central part of said handlebar, and an inner surface extending from said end to said central part of said handlebar, wherein:

(1) for at least about ninety percent of the distance between said end and said central part of said handlebar, said outer surface is substantially parallel to said inner surface;

(2) for at least about ninety percent of the distance between said end and said central part of said handlebar, the distance between said outer surface and said inner surface is from about 2.2 to about 2.4 centimeters;

(c) disposed between said end of each of said first lateral handle and said second lateral handle and said central part of said handlebar is an intermediate portion comprised of a proximal end, a distal end, and a midpoint, wherein:

(1) at the midpoint of said intermediate portion, the distance between said outer surface of each of said first lateral handle and said second lateral handle and the inner surface of each of said first lateral handle and said second lateral handle is from about 0.7 to about 1.4 centimeters;

(2) at the proximal end of said intermediate portion, the distance between said outer surface of each of said first lateral handle and said second lateral handle and the inner surface of each of said first lateral handle and said second lateral handle is at least 1.0 centimeter greater than the distance between said outer surface of each of said first lateral handle and said second lateral handle and the inner surface of each of said first lateral handle and said second lateral handle at the midpoint of said intermediate portion;

(3) at the distal end of said intermediate portion, the distance between said outer surface of each of said first lateral handle and said second lateral handle and the inner surface of each of said first lateral handle and said second lateral handle is at least 1.0 centimeter greater than the distance between said outer surface of each of said first lateral handle and said second lateral handle and the inner surface of each of said first lateral handle and said second lateral handle at the midpoint of said intermediate portion and (d) said inner surface of each of said first lateral handle and said second lateral is formed by a first arcuate section, having a first radius of curvature a first concave section having a third radius of curvature joined to the first arcuate section, and a second arcuate section having a second radius of curvature joined to said first concave section, wherein:

(1) the first radius of curvature of said first arcuate section is substantially equal to the second radius of curvature of said second arcuate section, (2) said first arcuate section has a first center-point which is also a centerpoint of said second arcuate section, (3) the third radius of curvature of said first concave section is less than the first radius of curvature of said first arcuate section, and (4) said first concave section has a second center-point which is disposed between said first center-point and said inner surface.

2. The handlebar as recited in claim 1, wherein the linear distance between said proximal end of said intermediate portion and said distal end of said intermediate portion is at least about 2.5 centimeters.

3. The handlebar as recited in claim 2, wherein said intermediate portion of each of said first lateral handle and said second lateral handle has a substantially arcuate shape.

4. The handlebar as recited in claim 3, wherein said intermediate portion has a substantially arc-like shape with a radius of curvature of from about 1 to about 2.5 centimeters.

5. The handlebar as recited in claim 4, wherein said handlebar consists essentially of aluminum alloy.

6. The handlebar as recited in claim 5, wherein said handlebar is comprised of an extended tubular member.

7. The handlebar as recited in claim 6, wherein said tubular member comprises a interior with a substantially circular cross-sectional shape.

* * * * *